(12) United States Patent
O'Gorman, Jr. et al.

(10) Patent No.: US 9,275,198 B2
(45) Date of Patent: Mar. 1, 2016

(54) SYSTEMS AND METHODS FOR ELECTRONICALLY PUBLISHING CONTENT

(75) Inventors: Tim P. O'Gorman, Jr., Kirkland, WA (US); Christopher J. Anderson, Federal Way, WA (US); Alan MacArthur, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 13/491,992

(22) Filed: Jun. 8, 2012

(65) Prior Publication Data

US 2013/0145478 A1 Jun. 6, 2013

Related U.S. Application Data

(60) Provisional application No. 61/567,608, filed on Dec. 6, 2011.

(51) Int. Cl.
*G06F 21/24* (2006.01)
*G06F 21/10* (2013.01)

(52) U.S. Cl.
CPC ...................................... *G06F 21/10* (2013.01)

(58) Field of Classification Search
None
See application file for complete search history.

(56) References Cited

U.S. PATENT DOCUMENTS

| | | | |
|---|---|---|---|
| 5,917,912 A | 6/1999 | Ginter et al. | |
| 7,681,045 B2 * | 3/2010 | Pedersen et al. | 713/190 |
| 7,716,487 B2 * | 5/2010 | Venkatesan et al. | 713/176 |
| 7,917,749 B2 * | 3/2011 | Ginter et al. | 713/164 |
| 8,010,803 B2 * | 8/2011 | Pedersen et al. | 713/190 |
| 8,095,468 B2 * | 1/2012 | Szucs | 705/57 |
| 8,155,582 B2 * | 4/2012 | Rhoads et al. | 455/3.06 |
| 8,327,097 B2 * | 12/2012 | Miyamoto et al. | 711/162 |
| 8,332,478 B2 * | 12/2012 | Levy et al. | 709/217 |
| 8,412,677 B2 * | 4/2013 | Klose | 707/634 |
| 8,413,256 B2 * | 4/2013 | Gonzalez et al. | 726/27 |
| 8,417,087 B2 * | 4/2013 | Yamaguchi et al. | 386/200 |
| 2002/0002481 A1 * | 1/2002 | Uchio et al. | 705/9 |
| 2002/0152112 A1 * | 10/2002 | Myers | G06Q 10/103 705/301 |
| 2003/0101155 A1 * | 5/2003 | Gokhale | G06F 3/0601 |
| 2003/0145017 A1 * | 7/2003 | Patton et al. | 707/104.1 |
| 2003/0204432 A1 * | 10/2003 | Botscheck | G06D 10/10 715/738 |
| 2004/0044688 A1 * | 3/2004 | Brudz et al. | 707/104.1 |
| 2004/0044842 A1 * | 3/2004 | Trimmer | G06F 3/0605 711/111 |
| 2004/0054627 A1 * | 3/2004 | Rutledge | 705/50 |
| 2004/0158433 A1 * | 8/2004 | Wimschneider | G01N 30/88 702/183 |
| 2005/0007617 A1 * | 1/2005 | Tanaka | H04N 1/00278 358/1.13 |

(Continued)

FOREIGN PATENT DOCUMENTS

EP 2164074 3/2010

OTHER PUBLICATIONS

European Patent Office, "European Search Report," issued in connection with European Application No. 12195749, issued on Jul. 24, 2014, 7 pages.

*Primary Examiner* — Dede Zecher
*Assistant Examiner* — Richard McCoy
(74) *Attorney, Agent, or Firm* — Hanley, Flight & Zimmerman, LLC

(57) ABSTRACT

Systems and methods for electronically publishing content are disclosed. An example method includes receiving a content selection and receiving a selection of rights assigned to the content. The method also includes receiving a selection of one or more tags and associating the content with the rights assigned and the tag to enable a security trimmed rank adjusted search return of the content.

32 Claims, 13 Drawing Sheets

(56) References Cited

U.S. PATENT DOCUMENTS

| | | | |
|---|---|---|---|
| 2005/0022114 A1 | 1/2005 | Shanahan et al. | |
| 2006/0074710 A1* | 4/2006 | Funk | G06Q 40/00 705/2 |
| 2006/0212402 A1* | 9/2006 | Lundberg et al. | 705/51 |
| 2007/0094352 A1* | 4/2007 | Choi | H04L 67/02 709/218 |
| 2007/0250901 A1* | 10/2007 | McIntire et al. | 725/146 |
| 2008/0065401 A1* | 3/2008 | Abrahamson | 705/1 |
| 2008/0167902 A1* | 7/2008 | Baba | G06Q 50/24 705/3 |
| 2008/0256482 A1* | 10/2008 | Lee et al. | 715/781 |
| 2009/0089326 A1* | 4/2009 | Balasubramanian | 707/104.1 |
| 2009/0240703 A1* | 9/2009 | Yoshino | 707/10 |
| 2009/0254572 A1* | 10/2009 | Redlich et al. | 707/10 |
| 2009/0287653 A1* | 11/2009 | Bennett | 707/3 |
| 2009/0303073 A1* | 12/2009 | Gilling | G06F 1/1626 340/815.45 |
| 2009/0315914 A1* | 12/2009 | Gerhard | G06T 11/20 345/630 |
| 2010/0088296 A1* | 4/2010 | Periyagaram et al. | 707/705 |
| 2010/0227583 A1* | 9/2010 | Roy | H04L 12/1818 455/404.1 |
| 2010/0250497 A1* | 9/2010 | Redlich et al. | 707/661 |
| 2010/0278506 A1* | 11/2010 | Subbian | H04N 7/18 386/223 |
| 2010/0318475 A1* | 12/2010 | Abrahamson | 705/500 |
| 2011/0040732 A1* | 2/2011 | Anglin et al. | 707/687 |
| 2011/0078231 A1* | 3/2011 | Oliver et al. | 709/203 |
| 2011/0218928 A1* | 9/2011 | Refior | G06Q 50/184 705/310 |
| 2011/0225417 A1* | 9/2011 | Maharajh et al. | 713/150 |
| 2011/0262040 A1* | 10/2011 | Seely | G11B 27/034 382/167 |
| 2011/0264786 A1* | 10/2011 | Kedem et al. | 709/223 |
| 2012/0072999 A1* | 3/2012 | Ishigo et al. | 726/30 |
| 2012/0137173 A1* | 5/2012 | Burshan et al. | 714/15 |
| 2012/0144302 A1* | 6/2012 | Campanotti et al. | 715/716 |
| 2012/0151273 A1* | 6/2012 | Ben Or et al. | 714/41 |
| 2013/0036375 A1* | 2/2013 | Zavatone | G06F 11/3664 715/763 |
| 2013/0073964 A1* | 3/2013 | Meaney | G11B 27/34 715/716 |
| 2014/0081618 A1* | 3/2014 | Kim | G06F 17/289 704/2 |
| 2014/0209400 A1* | 7/2014 | Yao | B62M 6/45 180/167 |

* cited by examiner

SYSTEMS AND METHODS FOR ELECTRONICALLY PUBLISHING CONTENT

RELATED APPLICATION

This patent claims the benefit of U.S. Provisional Application No. 61/567,608, filed on Dec. 6, 2011, which is hereby incorporated herein by reference in its entirety.

FIELD OF THE DISCLOSURE

This disclosure relates to systems and methods for electronically publishing content.

BACKGROUND

Content is sometimes electronically published to enable others to access and/or view the content. However, with many known systems, content is often published multiple times causing inefficient storage. Additionally, storing multiple copies of a publication may cause confusion regarding which document is the most up to date version (i.e., the official source document) or which context of the document is to be used. Further, known publishing systems may not provide the relevance rank or provide content restriction delivery.

SUMMARY

An example method includes receiving a content selection and receiving a selection of rights assigned to the content. The method also includes receiving a selection of one or more tags and associating the content with the rights assigned and the tag to enable a security trimmed rank adjusted search return of the content.

An example apparatus includes an access device to receive a selection of content, a selection of rights assigned to the content, and one or more tags. The rights assigned include at least one of a content owner, a person, or group to be enabled to access the content. The tags are associated with one or more of a regulation to which the content is subject, a supplier tag, a control tag, or an individual tag. The apparatus also includes a processor to associate the content with the rights assigned and the one or more tags to enable a security trimmed rank adjusted search return of the content.

An example tangible machine accessible medium having instructions stored thereon that, when executed, cause a machine to receive a content selection and receive a selection of rights assigned to the content. The rights assigned include at least one of a content owner, a person, or group to be enabled to access the content. Additionally, the example tangible machine accessible medium having instructions stored thereon that, when executed, cause a machine to receive a selection of one or more tags. The tags are associated with one or more of a regulation to which the content is subject, a supplier tag, a control tag, or an individual tag. Additionally, the example tangible machine accessible medium having instructions stored thereon that, when executed, cause a machine to associate the content with the rights assigned and the tag to enable a security trimmed rank adjusted search return of the content.

The features, functions, and advantages that have been discussed can be achieved independently in various embodiments or may be combined in yet other embodiments further details of which can be seen with reference to the following description and drawings.

DETAILED DESCRIPTION

Figure 1:
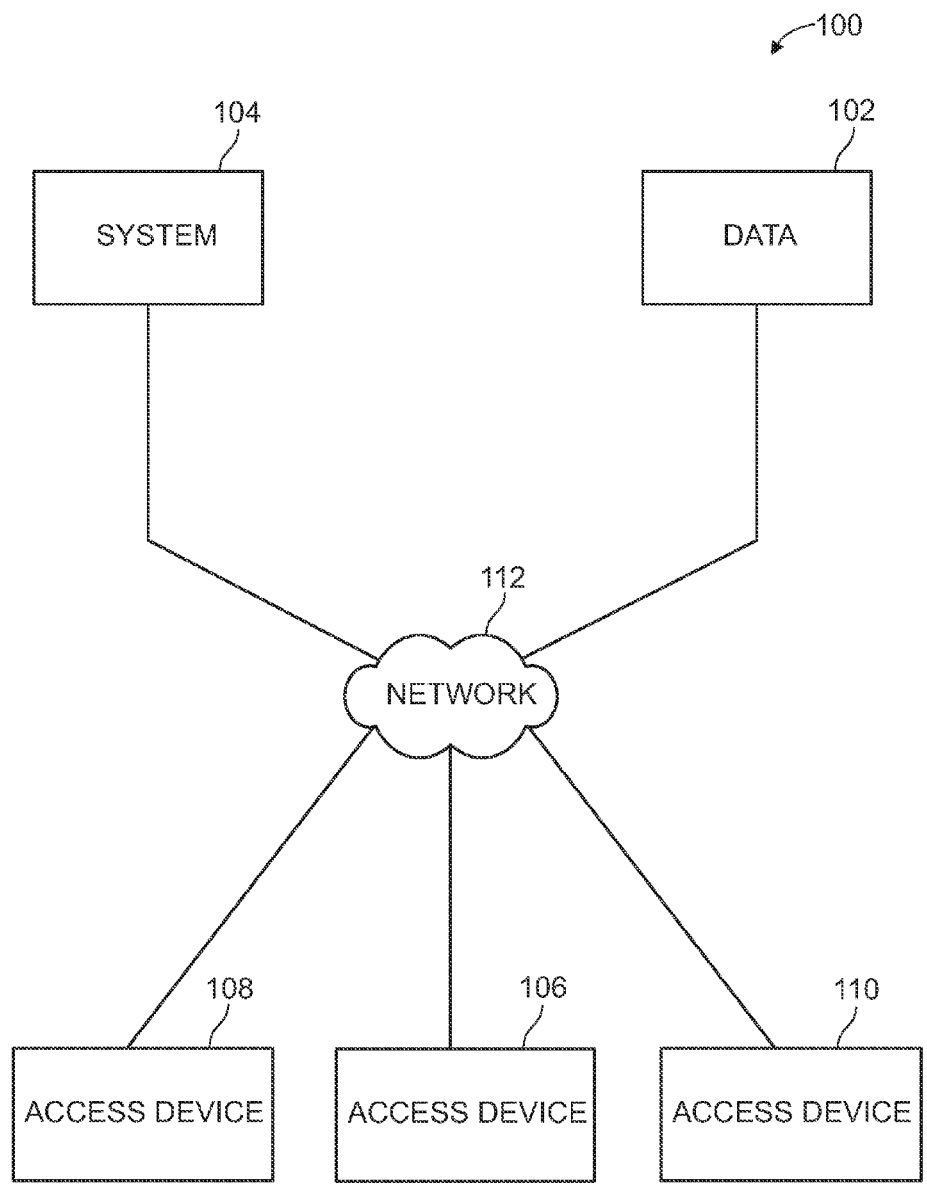
FIG. 1 is an illustration of an example system that can be used to implement the examples disclosed herein.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples disclosed herein relate to systems and methods for electronically publishing content. The content may be associated with one or more files, documents, uniform resource locators (URLs), etc. Using the examples disclosed herein, content is substantially prevented from being published multiple times (i.e., duplicated, replicated, etc.) to enable efficient, secure content storage. Additionally, the examples disclosed herein enable search results and/or returns to be context weighted and for these search results to provide security-trimmed views (e.g., to enable content to be viewable only by those given access thereto).

Using an example graphical interface described herein, a user (e.g., the publisher) may select content to be published and indicate whether the selected content is to be grouped. If the content is to be grouped, the system associates the content (e.g., different documents, different URLs) by generating and associating identifiers and/or tags with the content.

To ensure content is not published multiple times, the system reviews and/or scans the selected content and generates a first content-associated identifier (e.g., a hashcode). The first content-associated identifier may then be compared with other content-associated identifiers to determine if the same content has already been published. The other content-associated identifiers are associated with published content and may be stored in a database. If, based on the comparison, the system determines that the content has already been published, the user may be notified using the graphical user interface (e.g., a dashboard-type interface). However, if the system determines that the content has not already been published, the user may proceed with the publishing process.

Using the example interface, the user may assign rights to the content (e.g., provide file level security for the application) and may be prompted if the content is export controlled and/or has different or other restrictions. The user may also identify and/or select the individuals and/or groups that will be allowed to access (e.g., view) the content (e.g., distributed access administration). For example, the individuals and/or groups selected can be United States (U.S.) employees of an entity, non-U.S. employees of the entity, non-employees of the entity and/or selected from a limited distribution list. The user may also identify the content owner (e.g., the person and/or business entity that created the content) and if the content owner is to be notified. The user publishing the content may or may not be the owner. In some examples, the owner and/or the publisher may be allowed to edit or modify the content (e.g., add, change, remove one or more portions of the content) prior to and/or after publication.

Using the example interface described herein, the user and/or the system may add one or more tags, identifiers and/or external metadata to the content to facilitate content delivery (e.g., dynamic content delivery) and/or enable the content to be identifiable (e.g., export controlled content identification), searchable, etc. For example, the metadata (e.g., internal, external) and/or metadata types may enable rank adjusted and/or modified search returns using a combination of one or more search algorithms, relevance algorithms and/or rank adjustments (e.g., subject matter expert applied structured metadata relevance rank adjustment). The content may be rank adjusted based on a file name and/or one or more control tags, supplier tags, people tags, free text tags, content type tags, etc. Content may be indexed by properties and contents of the publication, the content owner, the content modifier, the content publisher, etc.

In some examples, the user can create one or more tags relating to whether the content is subject to International Traffic in Arms Regulations (ITAR) and/or Export Administration Regulations (EAR) and, if so, what the export control value and/or Jurisdictional and Classification Determination (JCD) are. The user and/or system may add and/or search for control tags, supplier tags and/or people tags. The control tags may include terms related to operations, a consortium, university research, global technology, etc. The supplier tags may include corporate and/or university entity names. The suppliers and/or people identified using the respective tags may identify the content as associated with the selected people and/or suppliers. The user may then publish the content after reviewing and confirming that a summary is complete and/or correct. The summary may include the name of the content, the name of the content owner and/or publisher, the rights assigned, tags added, etc.

FIG. 1 depicts an example system 100 in which the examples disclosed herein can be employed. The example system 100 includes a data store or source (e.g., a content organizer) 102 and a system (e.g., a search engine) 104 either of which may be implemented using a processor such as a processor system 1300 of FIG. 13. One or both of the data source 102 and/or the system 104 may interact with access devices (e.g., a visibility center) 106, 108 and/or 110. In some examples, the data source 102 and/or the system 104 can be implemented in a single system (e.g., a server farm). In some examples, the data source 102 and/or the system 104 can be wholly or partially implemented in the access devices 106, 108 and/or 110. The data source 102 and/or the system 104 can communicate with (e.g., receive and/or transmit data to) the access devices 106, 108 and/or 110 via a network (e.g., a data portal, a share point, etc.) 112. The access devices 106, 108 and/or 110 can communicate with (e.g., receive and/or transmit data to) the data source 102 and/or the system 104 via the network 112. The network 112 can be implemented by, for example, the Internet, an intranet, a private or personal network, a wired or wireless Local Area Network, a wired or wireless Wide Area Network, a cellular network and/or any other suitable network.

Figure 13:
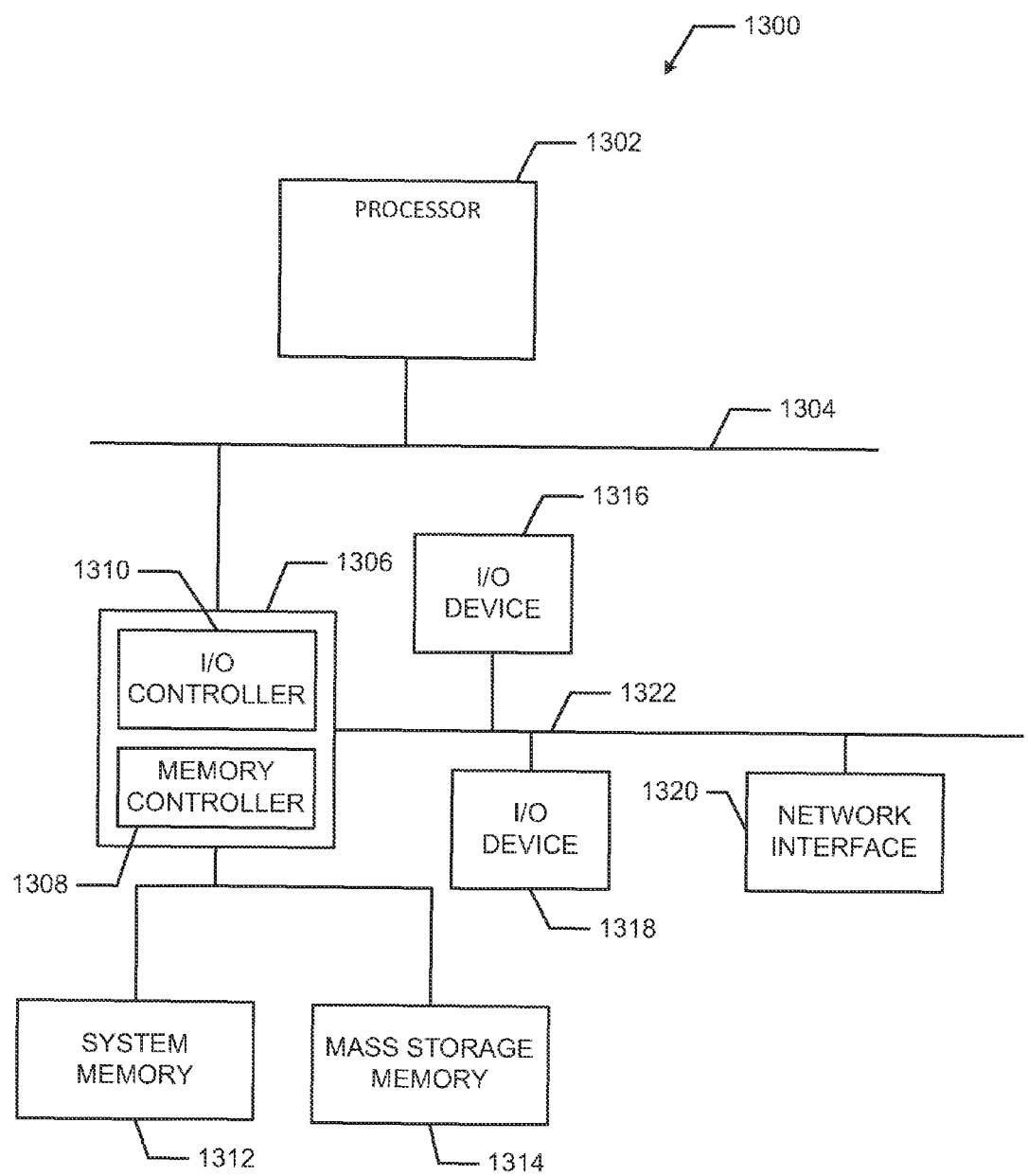
FIG. 13 is a schematic illustration of an example processor platform that may be used and/or programmed to implement any or all of the example methods and systems disclosed herein.

The access devices 106, 108 and/or 110 can be implemented using a workstation (e.g., a laptop, a desktop, a tablet computer, a mobile device, etc.) and/or a processor such as the processor system 1300 of FIG. 13. To enable a user to publish content using the examples disclosed herein, the access devices 106, 108 and/or 110 and the data source 102 and/or the system 104 may interact to ensure that content is not published multiple times, enable search returns to be context weighted and for these search results to provide security-trimmed views. For example, a user may be presented only with the published content that they have access to and in a context that is of interest to them.

To publish content using the access device 106, the user may select a first file or document to be published and indicate that the first document is not to be grouped with other documents. A content-associated identifier may be generated based on a review and/or scan of the selected first document. The content-associated identifier may be compared to other content-associated identifiers to ensure that the content has not already been published. If it is determined that the content has already been published, the user may be notified via the access device 106.

In some examples, the review, scan, identifier generation and/or comparison may be wholly and/or partially performed via the access device 106. In other examples, the first document may be transferred from the access device 106 to the data source 102 and/or the system 104 where the review, identifier generation and/or comparison may be wholly and/or partially performed. The other content-associated identifiers are associated with published content and can be stored in the data source 102.

Using the access device 106, the user may identify restrictions of the first document (e.g., export controls) and the individuals and/or groups that will be allowed to access the first document. If the first document is identified as export controlled and that non-U.S. persons are to have access to the first document, the data source 102, the system 104 and/or the access device 106 may notify the user that such access is not permitted. Using the access device 106, the user can identify the content owner of the first document and if the content owner is to be notified of the publication, for example.

Using the access device 106, the user can add one or more tags to be associated with the first document. The tags facilitate content delivery and/or enable the content to be identifiable and/or searchable. The tags may relate to export controls, regulations, control tags, supplier tags and/or people tags. Using the access device 106, the user may then publish the first document after confirming that the content owner, content to be published, rights assigned and/or tags added, etc. are complete and/or correct. The published document may be accessible to and/or stored in the data source 102 and/or the system 104. While the above example describes using the access device 106, any of the other access devices 108 and/or 110 may be used instead. Additionally, while three access devices 106-110 are shown, any other number of access devices may be used instead (e.g., 1, 2, 4, 5, etc.).

Figure 2:
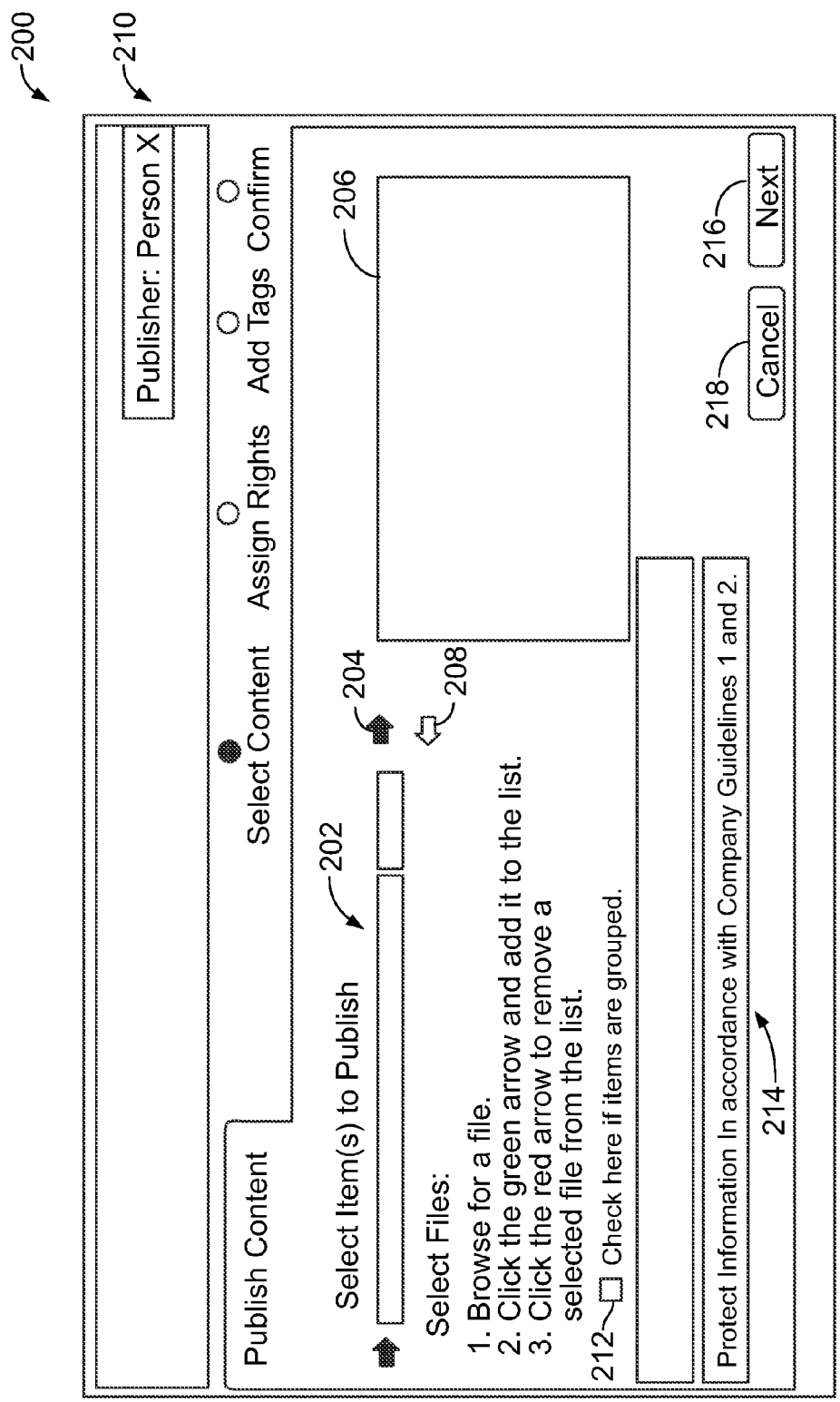
FIGS. 2-5 are illustrations of example user interfaces that can be used to implement the examples disclosed herein.

FIG. 2 depicts an example user interface 200 that can be used to implement the examples disclosed herein. The user interface 200 enables a user to select content that is to be published. The user interface 200 includes a browser 202 that enables a user to find, identify and/or select content (e.g., one or more files or documents, URLs, etc.). The user interface 200 includes an add icon 204 to enable the selected content to be added to a list area 206 and a remove icon 208 that enables a user to remove at least some of the selected content from the list area 206. The user interface 200 may also include an identification area 210 that identifies the publisher (e.g., the user), a check box 212 that enables the user to indicate whether or not content is to be grouped (e.g., grouping two or more files, documents, etc.) and one or more regulation information links 214.

In operation, using the browser 202, a user may select a first file or document and then add the first document to the list area 206 by selecting (e.g., clicking on) the add icon 204. Using the browser 202, the user may also select a second file or document that can be added to the list area 206 by selecting the add icon 204. If the first and second files or documents are to be grouped, the user selects the checkbox 212. If no additional documents are to be added to the list area 206, the user can select a next icon 216. Alternatively, if the user chooses to not proceed with publishing the content, the user can select a cancel icon 218.

In some examples, to ensure content is not published multiple times, after the user selects the add icon 204, a related system (e.g., the system 104) scans the respective selected files or documents and generates first and second content-associated identifiers. Also, because the first and second documents are to be grouped, the system (e.g., the system 104) also associates an identifier with the first and second documents to indicate their association. The system may compare the generated identifiers with other content-associated identifiers to determine if the same content has already been published. If, based on the comparison, the system determines that the content has already been published, the user may be notified using the user interface 200 and/or an associated pop-up window. However, if the system determines that the content has not already been published, the user may proceed with the publishing process.

Figure 3:
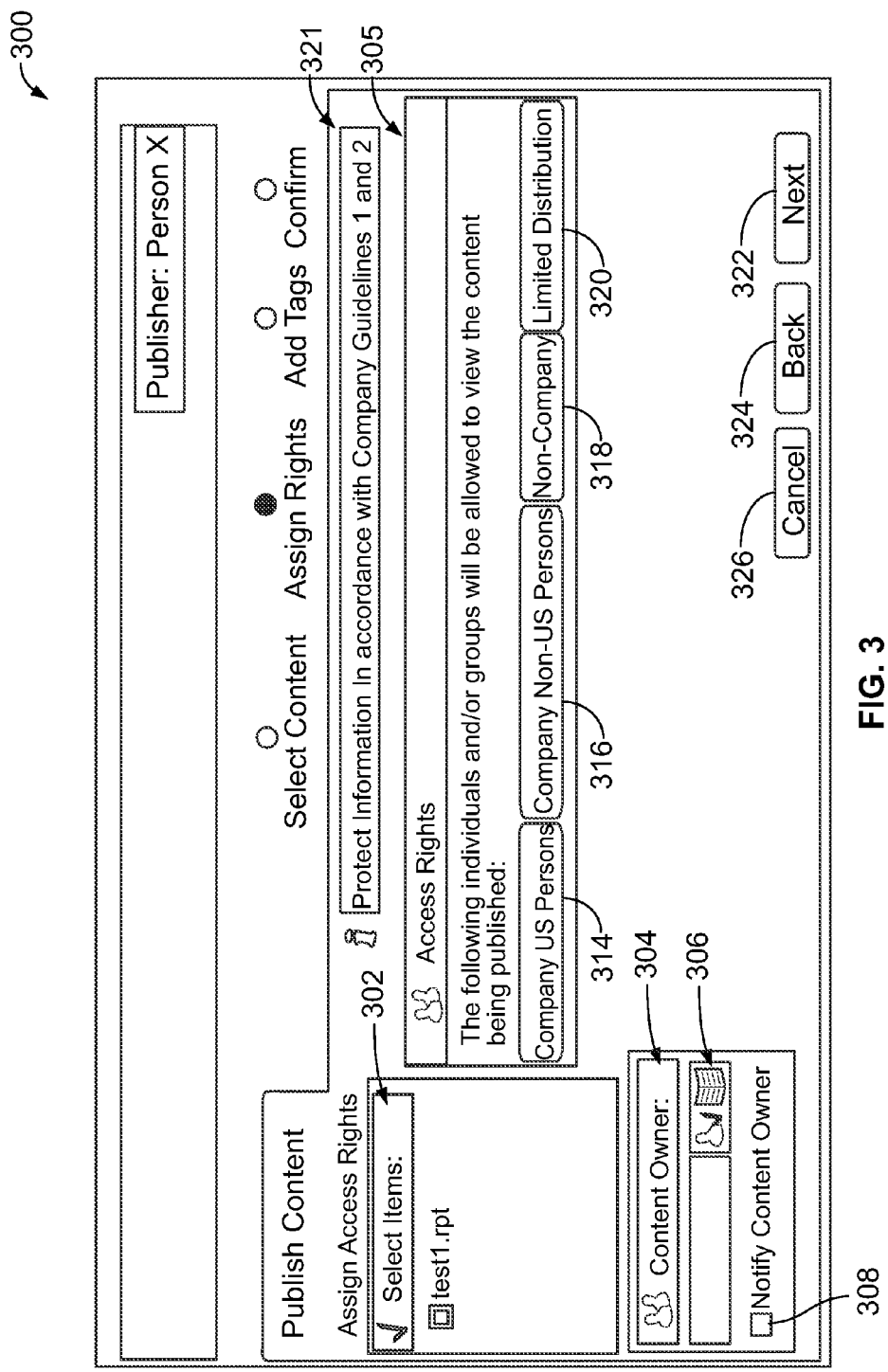

FIG. 3 depicts another example user interface 300 that can be used to implement the examples disclosed herein. The user interface 300 enables rights to be assigned to the content selected via the example user interface 200 of FIG. 2. The example user interface 300 of FIG. 3 includes a selected content list 302 in which the selected content may be listed. The example user interface 300 also includes a content owner area 304 and an access rights area 305. The content owner area 304 includes a content owner browser and/or identifier 306 that enables the content owner to be identified and a checkbox 308 that enables the user to indicate if the content owner is to be notified of the publication. The access rights area 305 includes a plurality of icons to designate who will have access rights to the content. The icons may include a company U.S. persons icon 314, a company non-U.S. persons icon 316, a non-company icon 318 and a limited distribution list icon 320. However, additional and/or different icons representing additional and/or different entities selectable to have access rights to the content may be provided to suit the needs of the particular application. The example user interface 300 may also include one or more regulation links 321 that the user can select to assist in determining whether or not the content to be published is governed by one or more regulations (e.g., export controls).

In operation, a user can identify the content owner using the content owner browser 306 and may select the checkbox 308 if the content owner is to be notified of the publication and/or of subsequent modifications. The user can also select which individuals, groups and/or entities are to have access rights to the content (e.g., who can access and/or view the content) by selecting one or more of the icons 314-320. After the owner and/or those having access rights are identified, the user can select a next icon 322. Alternatively, the user can select a back icon 324 to go back to the example user interface 200 of FIG. 2 or a cancel icon 326 if the user chooses to not proceed with publishing the content.

Figure 4:
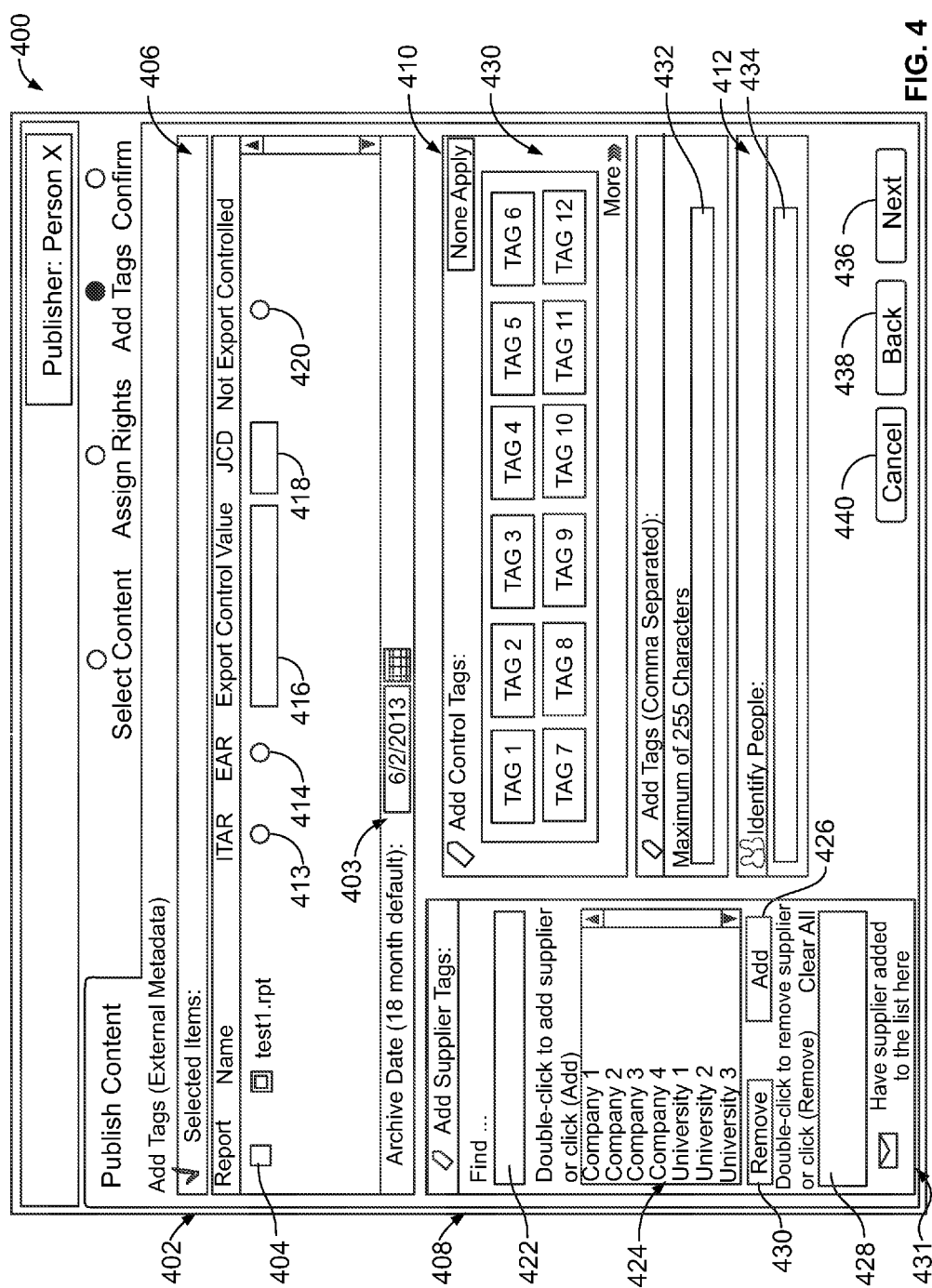

FIG. 4 depicts another example user interface 400 that can be used to implement the examples disclosed herein. The example user interface 400 of FIG. 4 enables tags to be added to the content to facilitate content delivery. The example user interface 400 of FIG. 4 includes a selected content list 402, an archive date selector 403 and a checkbox 404 that can be selected to indicate that the corresponding content is to be published and/or reported (e.g., the content is to be designated as a report). The example user interface 400 also includes a regulation area 406, a supplier area 408, a control tag area 410 and a person identifier area 412.

In this example, the regulation area 406 includes an ITAR radio button and/or checkbox 413, an EAR radio button and/or checkbox 414, an export control value entry field 416, a JCD entry field 418 and a not export controlled radio button and/or check box 420. The supplier area 408 includes a search field 422 to enable the user to quickly search for a particular entity and an entity list area 424 that includes a listing of entity names for user selection. The supplier area 408 also includes an add icon 426 to enable the selected corporate entity to be added to a supplier list area 428 and a remove icon 430 that enables a user to remove one or more of the selected entities from the list area 428. The supplier area 408 also includes an icon 431 to enable a user to add a supplier previously not listed to the list of suppliers. The control tag area 410 includes a plurality of tags 433, which may be selected by clicking on the 2-state buttons. A two state button may be a button that changes color once selected. For example, in an unselected state, the button may have a blue border, blue lettering and a white filling and in a selected state, the button may have blue filling with white lettering. An entry field 432 enables the publisher to enter one or more free-form tags (e.g., publisher created tags) that may be associated with the content to be published. The person identifier area 412 includes a search field and/or entry field 434 to list and/or identify people that are to be associated with the content.

In operation, a user can identify which of the selected content is to be identified as the report by selecting the checkbox 404. In some examples, the unselected content may be supporting documents to the selected report. The user can identify what, if any, restrictions are to be associated with the content by selecting and/or adding data to the icons or data fields of the regulation area 406. The user can select which suppliers, if any, are to be associated with the content by selecting the icons of the supplier area 408. The user can select which control tags, if any, are to be associated with the content by selecting and/or adding data to the icons or data fields of the control tag area 410. The user can select which people tags, if any, are to be associated with the content by selecting and/or adding data to the data field of the person identifier area 412. After the tags have been identified, the user can select a next icon 436. Alternatively, the user can select a back icon 438 to go back to an example user interface 300 of FIG. 3 or a cancel icon 440 if the user chooses to not to proceed with publishing the content.

Figure 5:
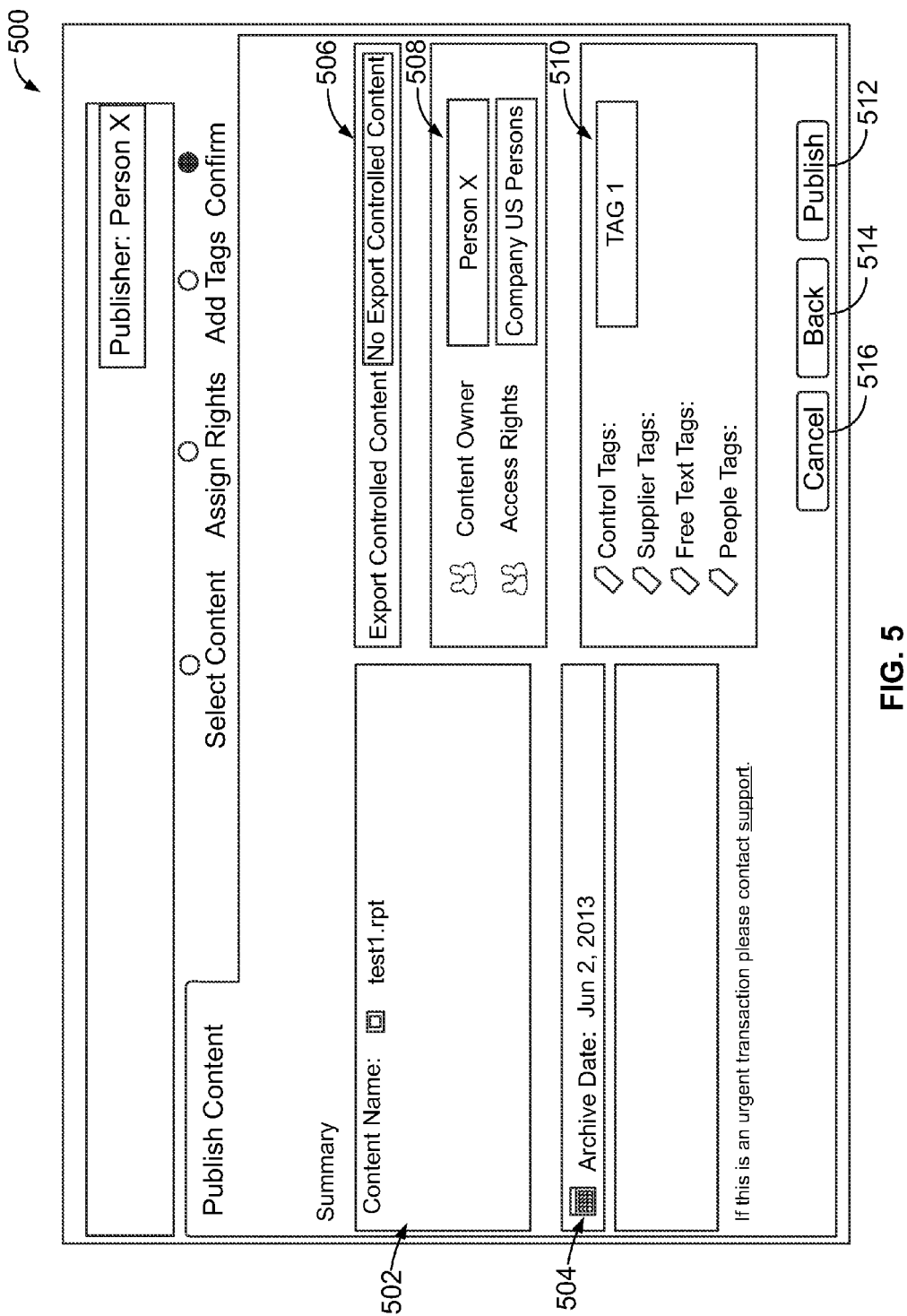

FIG. 5 depicts another example user interface 500 that can be used to implement the examples disclosed herein. The example user interface 500 of FIG. 5 enables information to be confirmed prior to the content being published. The example user interface 500 identifies selected content 502, an archive date 504, restrictions 506, rights assigned (e.g., content owner, access rights) 508 and tags (e.g., control tags, supplier tags, free text tags) 510. Once the user has confirmed that the information listed is accurate, the user can select a publish icon 512. Alternatively, the user can select a back icon 514 to go back to the example user interface 400 of FIG. 4 or a cancel icon 516 if the user chooses to not proceed with publishing the content.

Figure 6:
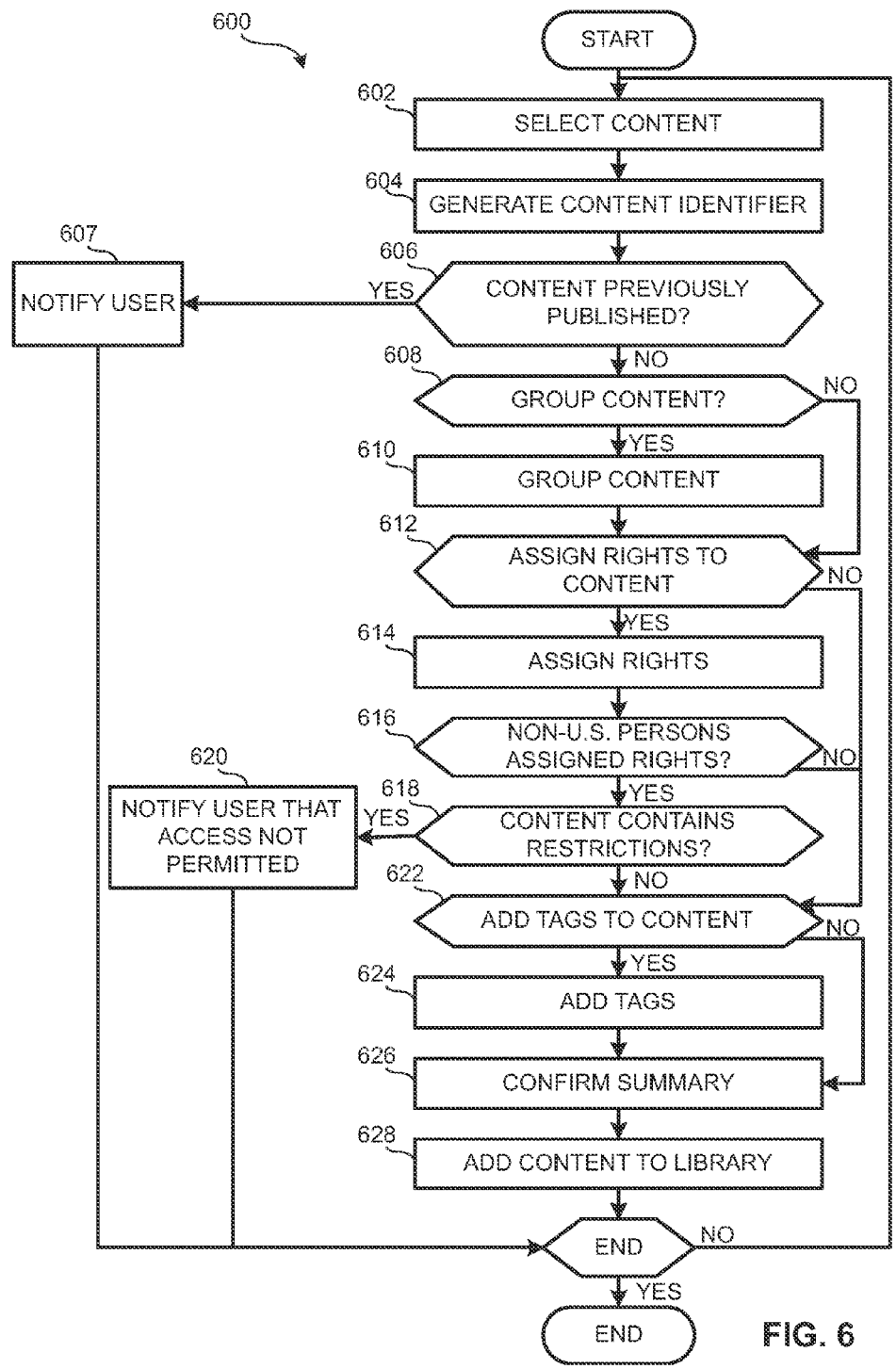
FIG. 6 depicts an example method that can be used to implement the examples disclosed herein.

While an example manner of implementing the examples disclosed herein such as the system 100 of FIG. 1 has been illustrated in FIG. 6, one or more of the elements, processes and/or devices illustrated in FIG. 6 may be combined, divided, re-arranged, omitted, eliminated and/or implemented in any other way. Further, the data source 102, the system 104, the access device(s) 106 and/or, more generally, an example method 600 of FIG. 6 may be implemented by hardware, software, firmware and/or any combination of hardware, software and/or firmware. Thus, for example, the data source 102, the system 104, the access device(s) 106 and/or, more generally, the example method 600 of FIG. 6 could be implemented by one or more circuit(s), programmable processsor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the data source 102, the system 104 and/or the access device(s) 106 are hereby expressly defined to include a tangible computer readable medium such as a memory, DVD, CD, BluRay, etc. storing the software and/or firmware. Further still, the example method 600 of FIG. 6 may include one or more elements, processes and/or devices in addition to, or instead of, those illustrated in FIG. 6, and/or may include more than one of any or all of the illustrated elements, processes and devices.

A flowchart representative of the example method 600 for implementing the data source 102, the system 104 and/or the access device(s) 106 is shown in FIG. 6. In this example, the method 600 comprises a program for execution by a processor such as the processor 1302 shown in the example computer 1300 discussed below in connection with FIG. 13. The program may be embodied in software stored on a tangible computer readable medium such as a CD-ROM, a floppy disk, a hard drive, a digital versatile disk (DVD), a BluRay disk, or a memory associated with the processor 1302, but the entire program and/or parts thereof could alternatively be executed by a device other than the processor 1302 and/or embodied in firmware or dedicated hardware. Further, although the example program is described with reference to the flowchart illustrated in FIG. 6, many other methods of implementing the example data source 102, the system 104 and/or the access device(s) 106 may alternatively be used. For example, the order of execution of the blocks may be changed, and/or some of the blocks described may be changed, eliminated, or combined.

As mentioned above, the example operations of FIG. 6 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example operations of FIG. 6 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

The user may begin by selecting content to be published (block 602). The content may be in a single file, multiple files and/or one or more URLs. The content may be reviewed and an associated content identifier may be generated (block 604). The content identifier is compared to other content identifiers to determine if the content has been previously published (block 606). If the content has been previously published, the user is notified that the content has been previously published (block 607). If not, the user determines if the selected content is to be grouped (e.g., associating more than one file together) (block 608) and, if so, the selected content is grouped (block 610).

The user may then determine what rights are to be assigned to the content (block 612) and the rights may be assigned to the content at block 614. The rights assigned may include identifying the content owner and/or the individuals and/or groups that are to be associated with, have access to and/or are to view the content. The user may indicate if non-U.S. persons are to be assigned rights (block 616) and, if so, if the content contains restrictions (e.g., export controls) (block 618). If the user indicates that non-U.S. persons are to be assigned rights and that the content contains restrictions, the user may be notified that such access is not permitted (block 620).

The user may then determine if one or more tags are to be added to the content (block 622). If so, one or more tags may be added to the content (block 624). The tags may include people tags, control tags, the archive date, free text tags, content type and/or restrictions (e.g., export controlled, not export controlled, etc.). The user may then verify that the content and associated data are correct (block 626). For example, the user may verify that the files to be published are correct, the export control status is correct, the content owner is correct, the access rights are correct, the archive date is correct and/or the tags are correct. The user may then add the content to an active library (block 628).

Figure 7:
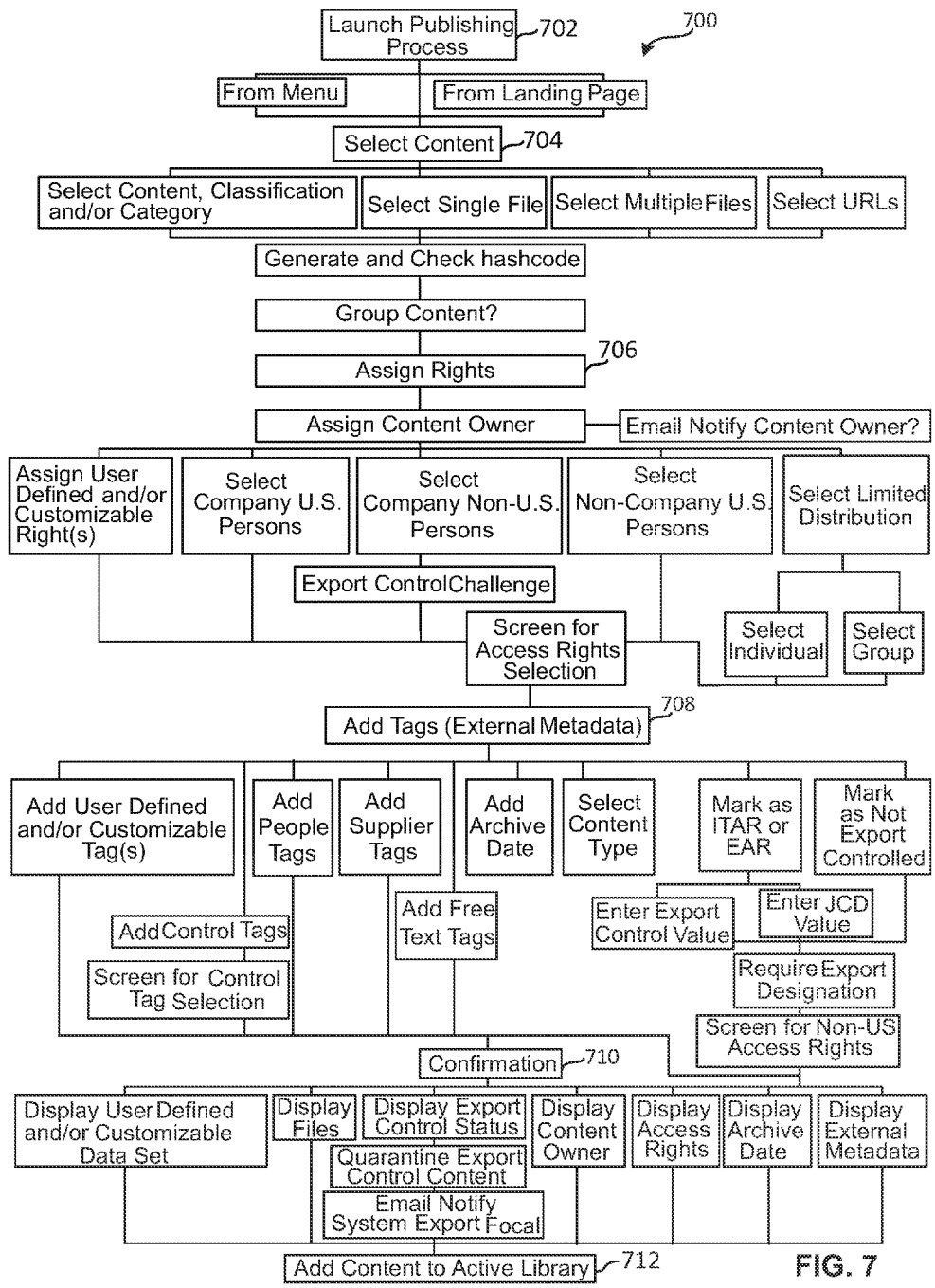
FIG. 7 depicts an example workflow that can be used to implement the examples disclosed herein.

FIG. 7 depicts an example workflow 700 that may be implemented using the example system described herein. One or more of the elements, processes and/or devices illustrated in FIG. 7 may be combined, divided, re-arranged, omitted, eliminated and/or implemented in any other way. At block 702, the user may launch the program and, at block 704, the user may select content to be published. At block 706, the user can assign rights to the content and, at block 708, the user can add one or more tags to the content (e.g., external metadata). At block 710, the user can confirm the accuracy of the selected content, rights assigned, tags added, etc., and, at block 712, the user can add the content to an active library. As shown, a user may define and/or customize one or more of content, classification, and/or category, the right(s) assigned, the tag(s) added and/or the data displayed. Further, while not shown, the user may define and/or customize how the content and associated field(s) (e.g., tags, etc.) is stored in a data structure. Thus, using the examples disclosed herein, users (e.g., customers) may customize how a file, document, URL, etc., is treated, processed, displayed, published, stored, etc., based on a user's specific preferences and/or needs.

Figure 8:
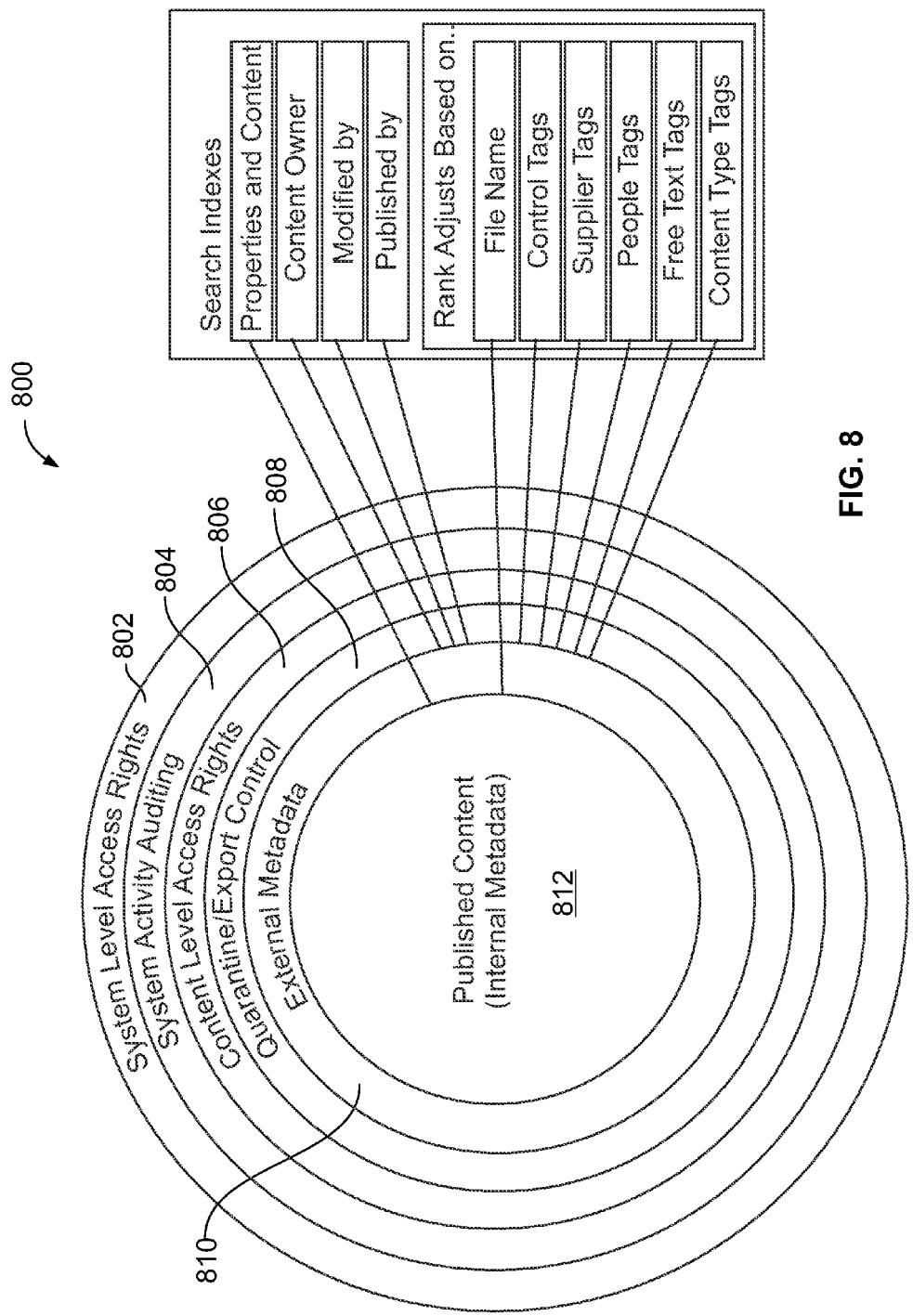
FIG. 8 is a diagrammatic view depicting different layers of security and/or access rights that can be used to implement the examples disclosed herein.

FIG. 8 is a diagrammatic view depicting the different layers of security and/or access rights 800. The first layer 802 is associated with file level access rights, the second layer 804 is associated with system activity auditing and the third layer 806 is associated with content level access rights. The fourth layer 808 is associated with quarantine/export controls, the fifth layer 810 is associated with external metadata and the sixth layer 812 is related to published content and/or internal metadata. However, additional and/or different layers representing additional and/or different layers of security and/or access rights may be provided to suit the needs of a particular application.

Figure 9:
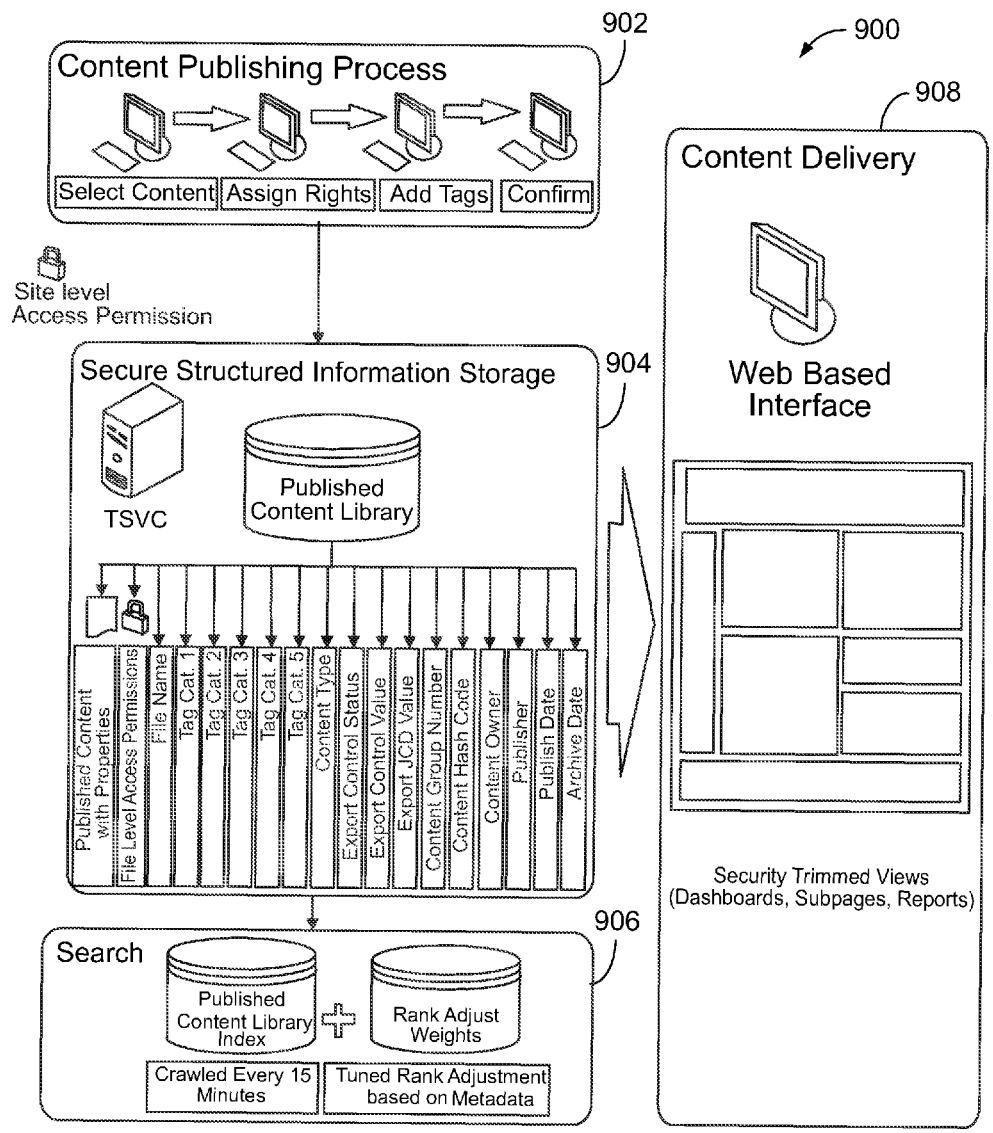
FIG. 9 is an example workflow that can be used to implement the examples disclosed herein.

FIG. 9 depicts an example workflow 900 that may be implemented using the example system described herein. One or more of the elements, processes and/or devices illustrated in FIG. 9 may be combined, divided, re-arranged, omitted, eliminated and/or implemented in any other way. Block 902 corresponds to the publishing process, block 904 corresponds to how the content is stored, block 906 corresponds to how the content is searched and block 908 corresponds to how the content is delivered.

Figure 10:
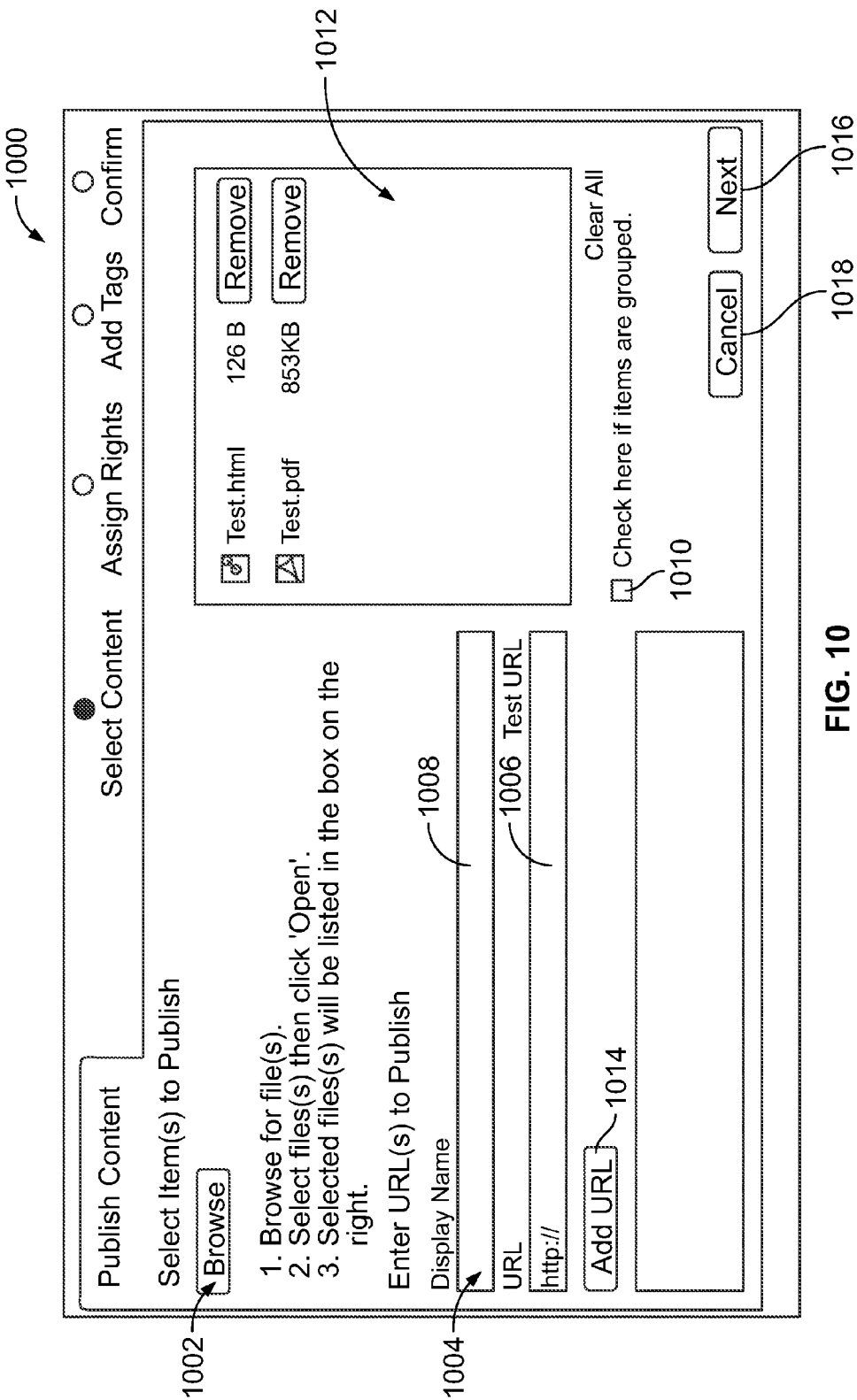
FIGS. 10-12 are illustrations of example user interfaces that can be used to implement the examples disclosed herein.

FIG. 10 depicts an example user interface 1000 that can be used to implement the examples disclosed herein. The user interface 1000 enables a user to select content that is to be published. The user interface 1000 includes a browser 1002 that enables a user to find, identify and/or select content (e.g., one or more files or documents, etc.). The user interface 1000 also includes a URL(s) identification area 1004 having an area 1006 where a user may identify a URL to be published and a naming area 1008 where a user may input a display name for the identified URL. The user interface 1000 may include a check box 1010 that enables the user to indicate whether or not content is to be grouped (e.g., grouping two or more files, documents, etc.).

In operation, using the browser 1002, a user may select a first file or document and then add the first document to a list area 1012 by selecting (e.g., clicking on) the first document. Using the browser URL(s) identification area 1006, the user may also select a URL that can be added to the list area 1012 by identifying the URL in the area 1006 and/or the naming area 1008 and clicking and/or selecting an add URL icon 1014. If the first and second files or documents are to be grouped, the user selects the checkbox 1010. If no additional documents are to be added to the list area 1012, the user can select a next icon 1016. Alternatively, if the user chooses to not proceed with publishing the content, the user can select a cancel icon 1018.

In some examples, to ensure content is not published multiple times after the files, documents and/or URL(s) are added to the list area 1012, a related system (e.g., the system 104) scans the respective selected files or documents and generates first and second content-associated identifiers. Also, because the first and second documents are to be grouped, the system (e.g., the system 104) also associates an identifier with the first and second documents to indicate their association. The system may compare the generated identifiers with other content-associated identifiers to determine if the same content has already been published. If, based on the comparison, the system determines that the content has already been published, the user may be notified using the user interface 1000 and/or an associated pop-up window. However, if the system determines that the content has not already been published, the user may proceed with the publishing process.

Figure 11:
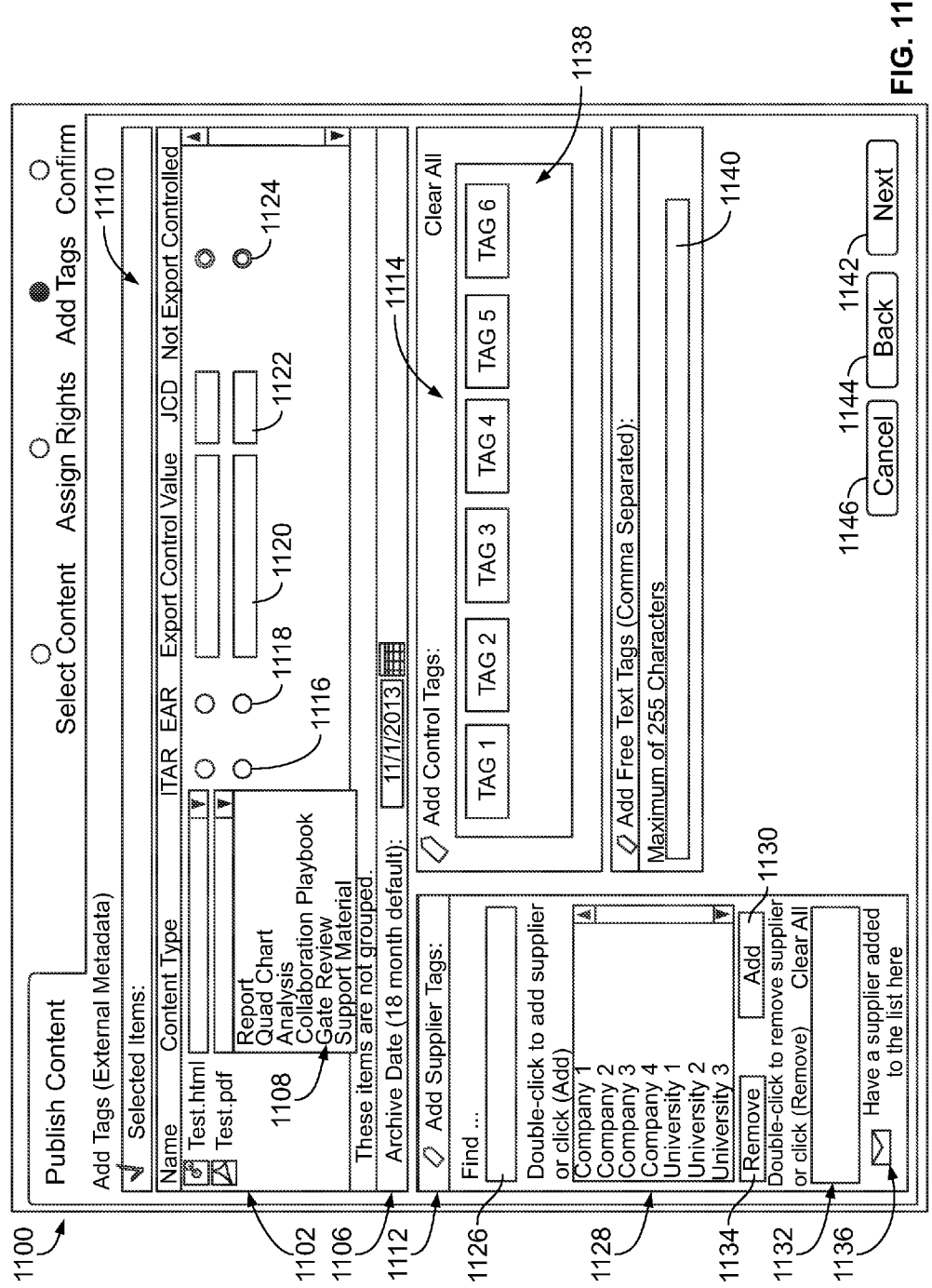

FIG. 11 depicts another example user interface 1100 that can be used to implement the examples disclosed herein. The example user interface 1100 of FIG. 11 enables tags to be added to the content to facilitate content delivery. The example user interface 1100 of FIG. 11 includes a selected content list 1102, an archive date selector 1106 and a menu 1108 to enable a document type to be selected and/or identified. In this example, the document may be identified as a report, a quad chart, analysis, collaboration playbook, gate review or support material. The example user interface 1100 also includes a regulation area 1110, a supplier area 1112 and a control tag area 1114.

In this example, the regulation area 1110 includes an ITAR radio button and/or checkbox 1116, an EAR radio button and/or checkbox 1118, an export control value entry field 1120, a JCD entry field 1122 and a not export controlled radio button and/or check box 1124. The supplier area 1112 includes a search field 1126 to enable the user to quickly search for a particular entity and an entity list area 1128 that includes a listing of entity names for user selection. The supplier area 1112 also includes an add icon 1130 to enable the selected corporate entity to be added to a supplier list area 1132 and a remove icon 1134 that enables a user to remove one or more of the selected entities from the supplier list area 1132. The supplier area 1112 also includes an icon 1136 to enable a user to add a supplier previously not listed to the list of suppliers. The control area 1114 includes a plurality of tags 1138, which may be selected by clicking on the 2-state buttons. An entry field 1140 enables the publisher to enter one or more free-form tags (e.g., publisher created tags) that may be associated with the content to be published.

In operation, a user can identify the selected content type using the menu 1108. The user can identify what, if any, restrictions are to be associated with the content by selecting and/or adding data to the icons or data fields of the restriction area 1110. The user can select which suppliers, if any, are to be associated with the content by selecting the icons of the supplier area 1112. The user can select which control tags, if any, are to be associated with the content by selecting and/or adding data to the icons or data fields of the control tag area 1114. After the tags have been identified, the user can select a next icon 1142. Alternatively, the user can select a back icon 1144 to go back to the example user interface 1000 of FIG. 10 or a cancel icon 1146 if the user chooses to not to proceed with publishing the content.

Figure 12:
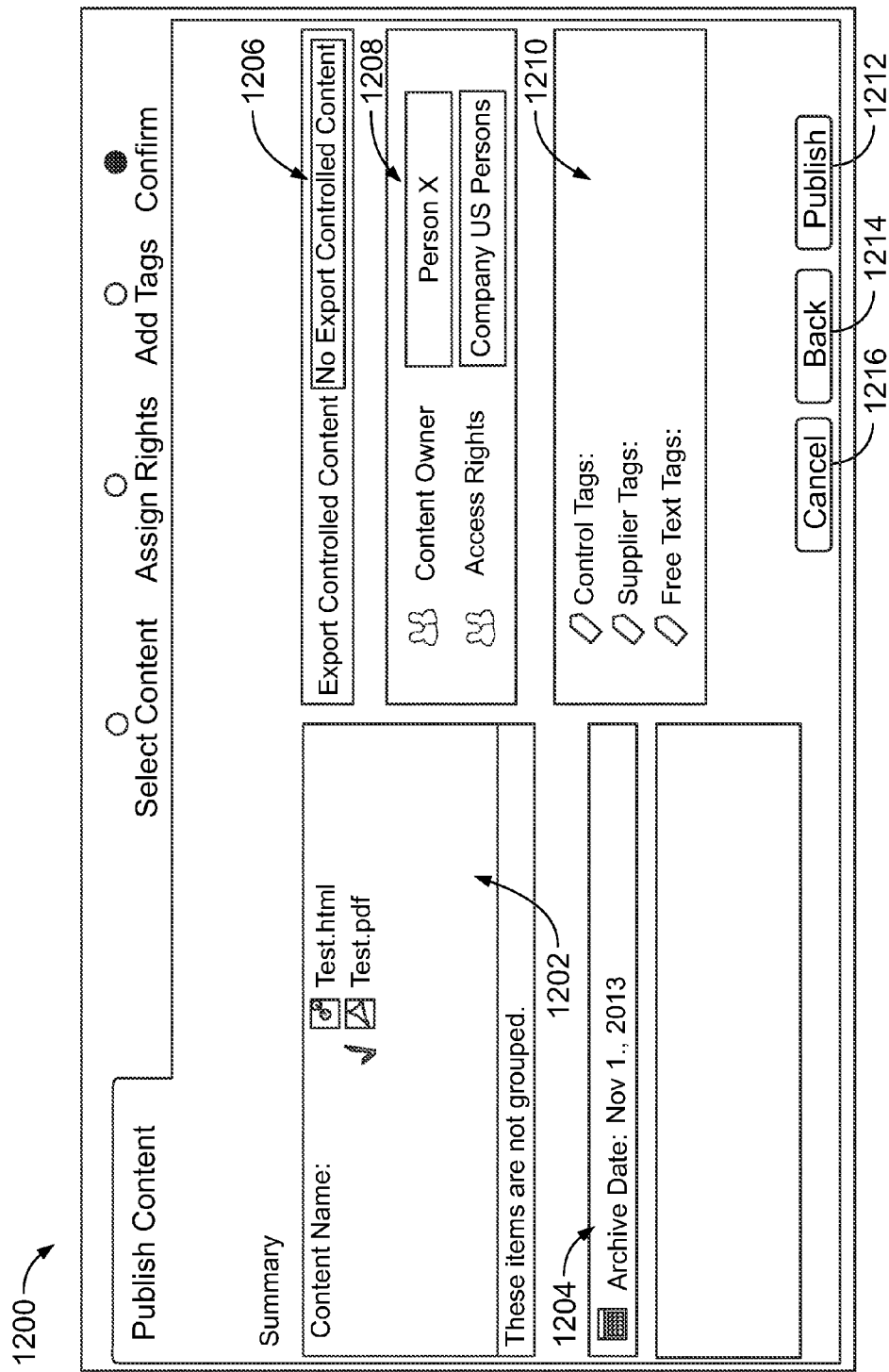

FIG. 12 depicts another example user interface 1200 that can be used to implement the examples disclosed herein. The example user interface 1200 of FIG. 12 enables information to be confirmed prior to the content being published. The example user interface 1200 identifies selected content 1202, an archive date 1204, restrictions 1206, rights assigned (e.g., content owner, access rights) 1208 and tags (e.g., control tags, supplier tags, free text tags) 1210. Once the user has confirmed that the information listed is accurate, the user can select a publish icon 1212. Alternatively, the user can select a back icon 1214 to go back to the example user interface 1100 of FIG. 11 or a cancel icon 1216 if the user chooses to not proceed with publishing the content.

FIG. 13 is a block diagram of an example processor system 1300 capable of executing the instructions of FIG. 6 to implement the access devices 106, 108 and/or 110, the system 104 and/or the data source 102 of FIG. 1 or any of the examples disclosed herein. As shown in FIG. 13, the processor system 1300 includes a processor 1302 that is coupled to an interconnection bus 1304. The processor 1302 may be any suitable processor, processing unit or microprocessor. Although not shown in FIG. 30, the processor system 1300 may be a multi-processor system and, thus, may include one or more additional processors that are identical or similar to the processor 1302 and that are communicatively coupled to the interconnection bus 1304.

The processor 1302 of FIG. 13 is coupled to a chipset 1306, which includes a memory controller 1308 and an input/output (I/O) controller 1310. As is well known, a chipset typically provides I/O and memory management functions as well as a plurality of general purpose and/or special purpose registers, timers, etc. that are accessible or used by one or more processors coupled to the chipset 1306. The memory controller 1308 performs functions that enable the processor 1302 (or processors if there are multiple processors) to access a system memory 1312 and a mass storage memory 1314.

The system memory 1312 may include any desired type of volatile and/or non-volatile memory such as, for example, static random access memory (SRAM), dynamic random access memory (DRAM), flash memory, read-only memory (ROM), etc. The mass storage memory 1314 may include any desired type of mass storage device including hard disk drives, optical drives, tape storage devices, etc.

The I/O controller 1310 performs functions that enable the processor 1302 to communicate with peripheral input/output (I/O) devices 1316 and 1318 and a network interface 1320 via an I/O bus 1322. The I/O devices 1316 and 1318 may be any desired type of I/O device such as, for example, a keyboard, a video display or monitor, a mouse, etc. The network interface 1320 may be, for example, an Ethernet device, an asynchronous transfer mode (ATM) device, an 802.11 device, a DSL modem, a cable modem, a cellular modem, etc. that enables the processor system 1300 to communicate with another processor system.

While the memory controller 1308 and the I/O controller 1310 are depicted in FIG. 13 as separate blocks within the chipset 1306, the functions performed by these blocks may be integrated within a single semiconductor circuit or may be implemented using two or more separate integrated circuits.

While the foregoing discusses particular examples of publishing content, the examples disclosed herein can be more generally and/or differently applied. For example, the examples disclosed herein may enable a user and/or entity to customize data and/or content and/or customize a search engine and/or a share point. Additionally, while the foregoing discusses assigning rights to content to enable security trimmed delivery of the content, the examples disclosed herein can be more generally and/or differently applied. For example, the examples disclosed herein can be generally applied to associating metadata (e.g., external, internal) with content (e.g., one or more files, documents, URLs) etc., to enable its classification and/or categorization and/or targeted search results to provide the relevant content a user is searching for. Such content may be associated with proprietary data, early design data, prototype data, project data, etc., for example.

Furthermore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method, comprising:
   receiving a selection of content in response to displaying a first selectable option on a first user interface to enable the content to be identified or selected;
   receiving a selection of rights assigned to the content in response to displaying a second selectable plurality of options on a second user interface, the second selectable options designating different rights to be associated with the content upon selection, the rights assigned to be associated with one or more groups to be granted access to the content, the rights assigned to enable a security trimmed search return;
   receiving a selection of one or more tags in response to displaying a third selectable plurality of options on a third user interface, the third selectable options corresponding to different tags to be associated with the content upon selection, the third selectable options including different control tags, different supplier tags, and different regulations associated with the content, in response to the selection of one or more of the third selectable options, the one or more tags are assigned to the content to enable at least one of content delivery, content identification, or content searchability, the tags are associated with one or more of the different regulations, one or more of the different supplier tags, or one or more of the different control tags, the one or more tags to enable a rank adjusted search return, the rights assigned are different than the one or more tags;
   directly associating the content with the rights assigned and the one or more tags to enable a security trimmed rank adjusted search return of the content;
   scanning the content and, in response to and based on the scanned content, generating a first content associated identifier, the first content associated identifier uniquely identifying the content;
   comparing the first content associated identifier to other content associated identifiers, the other content associated identifiers being associated with previously published content, the other content associated identifiers uniquely identifying respective portions of the previously published content, the comparing to determine if the first content associated identifier is substantially the same as one of the other content associated identifiers to determine that the content has not been published previously; and
   in response to determining that the content has not been published previously, publishing the content.

2. The method of claim 1, wherein the one or more groups include at least one of a content owner or a person to be enabled to access the content.

3. The method of claim 1, wherein the associating of the content with the rights assigned and the one or more tags is to enable a context weighted search return of the content.

4. The method of claim 1, wherein the content is to be published after receiving confirmation of an accuracy of one or more of a content owner, a person, or a group to be enabled to access the content.

5. The method of claim 1, wherein the one or more groups include one or more of United States employees of an entity, non-United States employees of the entity, non-employees of the entity, or individuals selected from a limited distribution list.

6. The method of claim 4, further comprising enabling at least one of the content owner or a content publisher to modify the content.

7. The method of claim 4, further comprising indexing the content based on one or more of the content owner, a content modifier, or a content publisher.

8. The method of claim 1, wherein the different regulations comprise one or more export controls.

9. The method of claim 1, further comprising grouping the content with other content by associating the first content associated identifier and the one or more other content associated identifiers with the content and the other content.

10. The method of claim 1, further comprising substantially preventing access to the content by a person or a group based on the regulation to which the content is subject.

11. An apparatus, comprising:
an access device to:
receive a selection of content in response to displaying a first selectable option on a first user interface to enable the content to be identified or selected;
receive a selection of rights assigned to the content in response to displaying a second selectable plurality of options on a second user interface, the second selectable options designating different rights to be associated with the content upon selection, the rights assigned comprising one or more groups to be enabled to access the content, the rights assigned to enable a security trimmed search return of the content;
receive a selection of one or more tags assigned to the content in response to displaying a third selectable plurality of options on a third user interface, the third selectable options corresponding to different tags to be associated with the content upon selection, the third selectable options including different control tags, different supplier tags, and different regulations associated with the content, in response to the selection of one or more of the third selectable options, the one or more tags are assigned to the content to enable at least one of content delivery, content identification, or content searchability, the tags are associated with one or more of the different regulations, one or more of the different supplier tags, or one or more of the different control tags, the one or more tags to enable a rank adjusted search return of the content, the rights assigned are different than the one or more tags; and
a processor to associate the content with the rights assigned and the one or more tags to enable a security trimmed rank adjusted search return of the content, the processor to process the content to determine a content associated identifier that uniquely identifies the content, the processor to compare the content associated identifier to other content associated identifiers to determine if the content has been published previously to prevent duplicate publication, the other content associated identifiers uniquely identifying respective portions of previously published content, the processor to enable the content to be published upon determining that the content has not been previously published.

12. The apparatus of claim 11, wherein the processor is to group the content with other content.

13. A tangible computer readable medium having instructions stored thereon that, when executed, cause a machine to:
receive a content selection in response to displaying a first selectable option on a first user interface to enable the content to be identified or selected;
receive a selection of rights assigned to the content in response to displaying a second selectable plurality of options on a second user interface, the second selectable options designating different rights to be associated with the content upon selection, the rights assigned comprising one or more groups to be enabled to access the content, the rights assigned to enable a security trimmed search return;
receive a selection of one or more tags in response to displaying a third selectable plurality of options on a third user interface, the third selectable options corresponding to different tags to be associated with the content upon selection, the third selectable options including different control tags, different supplier tags, and different regulations associated with the content, in response to the selection of one or more of the third selectable options, the tags are assigned to the content to enable at least one of content delivery, content identification, or content searchability, the tags are associated with one or more of the different regulations, one or more of the different supplier tags, or one or more of the different control tags, the one or more tags to enable a rank adjusted search return, the rights assigned are different than the one or more tags;
directly associate the content with the rights assigned and the one or more tags to enable a security trimmed rank adjusted search return of the content;
scan the content and, in response to and based on the scanned content, generate a first content associated identifier, the first content associated identifier uniquely identifying the content;
compare the first content associated identifier to other content associated identifiers to determine if the content has been published previously, the other content associated identifiers uniquely identifying respective portions of previously published content; and
in response to the content being determined as not being published previously, publish the content.

14. The method of claim 1, further comprising grouping the content with other content by associating the first content associated identifier and the one or more other content associated identifiers, wherein the content and the other content are at least partially different.

15. The method of claim 1, wherein the one or more tags are not a sub-category of the rights assigned.

16. The apparatus of claim 11, wherein the processor is to cause a notification to be displayed on a user interface if the content has been previously published.

17. The method of claim 1, wherein the receiving of the selection of the content includes enabling a user to identify content to publish.

18. The method of claim 17, wherein the first selectable option includes at least one of a button, an entry field, a search field, a scroll menu, a checkbox, or a selection list.

19. The method of claim 1, wherein the receiving of the selection of rights includes enabling a user to designate one or more of the different rights to be associated with the content, and receiving a selection of one or more of the second selectable options.

20. The method of claim 1, wherein the receiving of the selection of the one or more tags includes enabling a user to select one or more of the third selectable options, and receiving a selection of one or more of the third selectable options.

21. The method of claim 1, wherein
the third selectable options includes fourth selectable options associated with the different control tags and fifth selectable options associated with the different supplier tags; and
receiving a selection of one or more the fourth selectable options or the fifth selectable options.

22. The method of claim 21, wherein the fourth selectable options include buttons grouped in a first area of the user interface and the fifth selectable options include at least an entry field or a scrollable menu in a second area of the user interface, the first area spaced from the second area.

23. The method of claim 22, wherein the second area includes a first button to add a supplier tag to the supplier tags and a second button to remove a supplier tag from the supplier tags.

24. The method of claim 1, wherein the receiving of the selection of the content, the receiving of the selection of the rights assigned to the content, and the receiving of the one or more tags includes displaying on a user interface first tabs associated with the selection of the content, second tabs associated with the selection of the rights assigned to the content, and third tabs associated with the one or more tags, and receiving a selection of one or more of the first tabs, the second tabs, or the third tabs.

25. The method of claim 1, further including receiving a confirmation indicating the selection of the content, the selection of the rights, and the selection of the tags, the confirmation includes displaying a selectable confirmation tab indicating the selection of the content, the selection of the rights, and the selection of the tags.

26. The method of claim 1, wherein the receiving of the selection of the content, the receiving of the rights assigned, and the receiving of the one or more tags includes displaying, via a user interface, a publisher identifier, the publisher identifier associated with a publisher of the content.

27. The apparatus of claim 11, wherein the processor is to prevent access to the content by a person or a group based on a regulation to which the content is subject.

28. The apparatus of claim 11, wherein the processor is to index the content based on one or more of a content owner, a content modifier, or a content publisher.

29. The apparatus of claim 11, wherein the processor is to prevent publication of the content if the content has been previously published.

30. The method of claim 1, wherein two or more of the first user interface, the second user interface, or the third user interface are the same user interface.

31. The method of claim 1, wherein the third selectable options includes a selectable option associated with a first tag and a selectable option associated with a second tag.

32. The method of claim 1, wherein the third selectable options includes at least one of a first button, a first entry field, a first search field, a first scroll menu, a first checkbox, or a first selection list and at least one of a second button, a second entry field, a second search field, a second scroll menu, a second checkbox, or a second selection list.

* * * * *